US008228805B2

(12) United States Patent
Arora et al.

(10) Patent No.: US 8,228,805 B2
(45) Date of Patent: *Jul. 24, 2012

(54) SYSTEMS FOR DETECTING NAGLING ON A TCP NETWORK CONNECTION

(75) Inventors: Rajiv Arora, Austin, TX (US); Jesse M. Gordon, Austin, TX (US)

(73) Assignee: International Business Machines Corportion, Armonk, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/177,213

(22) Filed: Jul. 22, 2008

(65) Prior Publication Data
US 2008/0298233 A1 Dec. 4, 2008

Related U.S. Application Data

(63) Continuation of application No. 11/044,605, filed on Jan. 27, 2005, now Pat. No. 7,440,419.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 12/26* (2006.01)
*H04L 12/28* (2006.01)

(52) U.S. Cl. ........................................ 370/241; 370/254
(58) Field of Classification Search .......................... None
See application file for complete search history.

(56) References Cited

U.S. PATENT DOCUMENTS

| 6,018,516 | A  | * | 1/2000 | Packer ........................... 370/231 |
| 6,665,729 | B2 |   | 12/2003 | Walker |
| 7,266,613 | B1 |   | 9/2007 | Brown et al. |
| 2003/0110206 | A1 |   | 6/2003 | Osokine |
| 2004/0153863 | A1 | * | 8/2004 | Klotz et al. ....................... 714/45 |

FOREIGN PATENT DOCUMENTS

EP          1 179 925 A2    2/2002

OTHER PUBLICATIONS

Jeffery Mogul, Greg Minshall, Rethinking the TCP Nagle Algorithm, ACM SIGCOMM Computer Communication Review, vol. 31, Issue 1, Jan. 2001, pp. 1-14.*

(Continued)

*Primary Examiner* — Anh-Vu H Ly
*Assistant Examiner* — Christopher Crutchfield
(74) *Attorney, Agent, or Firm* — Stephen J. Walder, Jr.; Libby Z. Toub

(57) ABSTRACT

Systems for detecting Nagling on a TCP network connection are disclosed. Embodiments may generally include a system with a Nagle detection threshold determiner for determining a Nagle detection threshold based on the network connection. The system may also generally include a Nagle detection module in communication with the Nagle detection threshold determiner for observing a small segment at a second time following an acknowledgement indicative of a Nagling condition at a first time, wherein the Nagle detection module also may detect a Nagling condition if the difference between the second time and the first time is less than or equal to the Nagle detection threshold. The system may be a receiver computer or a network computer. The system may also generate and transmit a notification of the Nagling condition, increment a Nagle monitor counter, or save an indication of the Nagling condition in a log.

20 Claims, 5 Drawing Sheets

OTHER PUBLICATIONS

John Heidermann, Performance interactions between P-HTTP and TCP Implementations, Computer Communications Review, vol. 27, Issue 2, pp. 64-73, May 19, 1997.*

Author Unknown, Network Labs: Typical Problem Situations, Translated from German Using Google Translation, pp. 1-25, Sep. 1, 2004.*

Author Unknown, Sniffer Pro Getting Started Guide, Release 4.7, Sniffer Technologies, pp. 7-1 to 7-6, Mar. 2002.*

V. Paxon, M. Allman, Computing TCP's Retransmission Timer, RFC 2988, Nov. 2000, pp. 1-8.*

Thomas Truscott, Turning off Nagle's Algorithm, Posting on comp.os.ms-windows.networking.tcp-ip, May 13, 1999, pp. 1-2.*

Minshall, Greg et al., "Application Performance Pitfalls and TCP's Nagle Algorithm," Mar. 1, 1999, pp. 1-7.

Mogul, Jeffrey C., et al., "Rethinking the TCP Nagle Algorithm," ACM SIGCOMM, Computer Communication Review, vol. 31, Issue 1, Jan. 2001, pp. 6-20.

* cited by examiner

SYSTEMS FOR DETECTING NAGLING ON A TCP NETWORK CONNECTION

CROSS-REFERENCES TO RELATED APPLICATION(S)

Pursuant to 35 USC §120, this application claims priority to and benefit of U.S. patent application Ser. No. 11/044,605, entitled "SYSTEMS, METHODS, AND MEDIA FOR DETECTING NAGLING ON A TCP NETWORK CONNECTION", filed on Jan. 27, 2005, the disclosure of which is incorporated herein in its entirety for all purposes.

BACKGROUND OF THE INVENTION

The present invention is in the field of computer systems. More particularly, the present invention relates to systems for detecting Nagling on a Transmission Control Protocol (TCP) network connection, particularly for TCP network connections implementing Nagle algorithm [RFC 896] mechanisms.

Personal computer systems are well known in the art. They have attained widespread use for providing computer power to many segments of today's modern society. Personal computers (PCs) may be defined as a desktop, floor standing, or portable microcomputer that includes a system unit having one or more central processing units (CPUs) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. Examples of such personal computer systems are International Business Machine Corp.'s (IBM's) ThinkCentre™, ThinkPad™, Aptiva™, and IntelliStation™ series of personal computers.

PCs and other computer systems have also become increasingly connected by networks such as the Internet, intranets, Wide Area Networks (WANs), and Local Area Networks (LANs). Networks often use one or more protocols to facilitate communication between computers within the network and on other networks. Protocols such as the Internet Protocol (IP) and TCP are pre-established means of communication between computers on a network. IP allows for routing of packets of data (including both data and a header) from node to node, forwarding data packets based on a four byte destination address (the IP number). TCP creates a reliable communications stream on top of the somewhat unreliable packet IP (called TCP/IP when they are combined). TCP adds support to detect errors or lost data and to trigger retransmission until data is correctly and completely received. TCP treats data as a stream of bytes that includes a header that designates a starting byte and a size, allowing the receiver to detect missing or incorrectly sequenced packets.

Once a TCP connection is established, most transmissions ultimately result in a response (such as an ACK, or acknowledgement) from the receiver. Given the overheads associated with both TCP and IP, explicit acknowledgement of every transmission, however, could generate significant additional traffic. TCP therefore attempts to inject the fewest possible packets into the network to avoid congesting the network and adding load to routers and switches. A packet may be broken into multiple segments for ease of transmission. A "small" segment is any segment smaller than the Maximum Segment Size (MSS) negotiated by the sender and receiver when the TCP connection is established. The Nagle algorithm [described in Request for Comments (RFC) 896 of the Network Working Group entitled "Congestion Control in IP/TCP Internetworks", Jan. 6, 1984] is one mechanism used by TCP to reduce the number of acknowledgements transmitted over a network connection. The Nagle algorithm, when implemented, requires that a sender not have more than one unacknowledged small segment outstanding. When an unacknowledged small segment is outstanding, the sender holds any further data from an application until the outstanding segment is acknowledged by the receiver. TCP allows the receiver to possibly attach the acknowledgement to another response (a process also known as 'piggybacking'), eliminating the need for two transmissions and thus reducing the load on the network. When a TCP connection has primarily one-way communication, the opportunities for attaching the acknowledgement are limited. The Nagle algorithm thus often results in only one small segment being transmitted on a given connection per round trip time (RTT), which is the time it takes to transmit data and subsequently receive acknowledgement for that data, an undesirable delay in transmission in many instances.

The delays caused by the RTT when transmitting small segments are exacerbated by TCP's delayed acknowledgement policy. The traditional receiver TCP implementation delays sending an acknowledgement to a sender until it has data to send on the reverse path (allowing it to attach the ACK to the data), until it has at least two full-sized segments (2 times MSS bytes) to acknowledge, or until expiration of a delayed acknowledgement timer (typically about 200 milliseconds). When a sender transmits a small segment, the acknowledgement is typically not transmitted until expiration of the delayed acknowledgement timer, resulting in delays of hundreds of milliseconds on operations that should complete much faster and providing additional delays on top of the RTT time. Other delays are also possible because of the delayed acknowledgement timer, such as delays occurring in some operating systems (OS's) when a sender attempts to transmit a packet with a size larger than the OS network buffer size, which may result in one small segment remaining unacknowledged until expiration of the delayed acknowledgement timer.

The delay caused by the delayed acknowledgement time is particularly undesirable in situations with primarily one-way communication as acknowledgements of small segments will rarely be able to piggyback with other data. Because of the problems associated with the Nagle algorithm with some network connections, some application developers simply turn off the Nagle algorithm for a given network connection by using the TCP_NODELAY socket option. Additionally, system administrators on some operating systems can turn off the Nagle algorithm using OS tuning parameters. While for some applications this improves performance, for many applications turning off the Nagle algorithm will lead to increased stress of the network, particularly when some senders on the network have faulty output buffer management. Simply turning off the Nagle algorithm does not provide a satisfactory solution to Nagle-induced slowdown as turning off the Nagle algorithm can often slow down the network more than the Nagle algorithm itself. Moreover, turning off the Nagle algorithm also results in the loss of the benefits provided by the Nagle algorithm.

Another problem with turning off the Nagle algorithm is that this solution requires a correct diagnosis of a Nagle-induced slowdown in the first place. Current operating systems do not recognize when slowdowns are the result of Nagle-induced delays. When a network slowdown occurs, an administrator may not know what is causing the slowdown without having to analyze logs or to perform trace analysis.

Even when a network slowdown can be improved by turning off the Nagle algorithm, administrators cannot determine quickly that this solution will provide a benefit, resulting in it being often ignored.

There is, therefore, a need for an effective mechanism for detecting and managing the use of the Nagle algorithm in TCP networks, particularly when those networks are susceptible to Nagle-induced slowdowns. There is an even greater need for such a mechanism when applications are inefficient in their transmission of data packets.

BRIEF SUMMARY OF THE INVENTION

The problems identified above are in large part addressed by systems, methods and media for detecting Nagling on a TCP network connection. One embodiment includes receiving by a receiver computer a small segment from a sender computer and transmitting by the receiver computer a delayed acknowledgement of the small segment to the sender computer at a first time. After transmitting the delayed acknowledgement, the embodiment may further include receiving by the receiver computer a second small segment from the sender computer at a second time. The embodiment may also include determining by the receiver computer a Nagle detection threshold for the network connection and a difference between the second time and the first time, and if the difference between the second time and the first time is less than or equal to the Nagle detection threshold, detecting by the receiver computer system a Nagling condition. Further embodiments may also include incrementing by the receiver computer a Nagle monitor counter of the receiver computer in response to the detected Nagling condition and if the Nagle monitor counter is above a Nagle monitor threshold, transmitting by the receiver computer a Nagling warning.

A further embodiment includes searching by a network computer for a pure acknowledgement from a receiver computer to a sender computer over the network connection that acknowledge less than twice the MSS of data received since the last acknowledgement on the network connection and, if the pure acknowledgement is found, searching by the network computer for a small packet transmitted from the sender computer to the receiver computer after the pure acknowledgement. The embodiment may also include determining by the network computer a Nagle detection threshold and a difference in time between the detection of the pure acknowledgement and the small packet and, if the difference in time is less than or equal to the Nagle detection threshold, detecting by the network computer a Nagling condition. Further embodiments may also include observing by the network computer system a creation of the network connection between the receiver computer and the sender computer.

A further embodiment provides a data processing system for detecting Nagling on a TCP network connection. The system may generally include a Nagle detection threshold determiner for determining a Nagle detection threshold based on the network connection. The system may also generally include a Nagle detection module in communication with the Nagle detection threshold determiner for observing a small segment at a second time following an acknowledgement indicative of a Nagling condition at a first time, wherein the Nagle detection module also may detect a Nagling condition if the difference between the second time and the first time is less than or equal to the Nagle detection threshold.

BRIEF DESCRIPTION OF THE SEVERAL VIEWS OF THE DRAWINGS

Other objects and advantages of the invention will become apparent upon reading the following detailed description and upon reference to the accompanying drawings in which, like references may indicate similar elements.

DETAILED DESCRIPTION OF THE INVENTION

Figure 1:
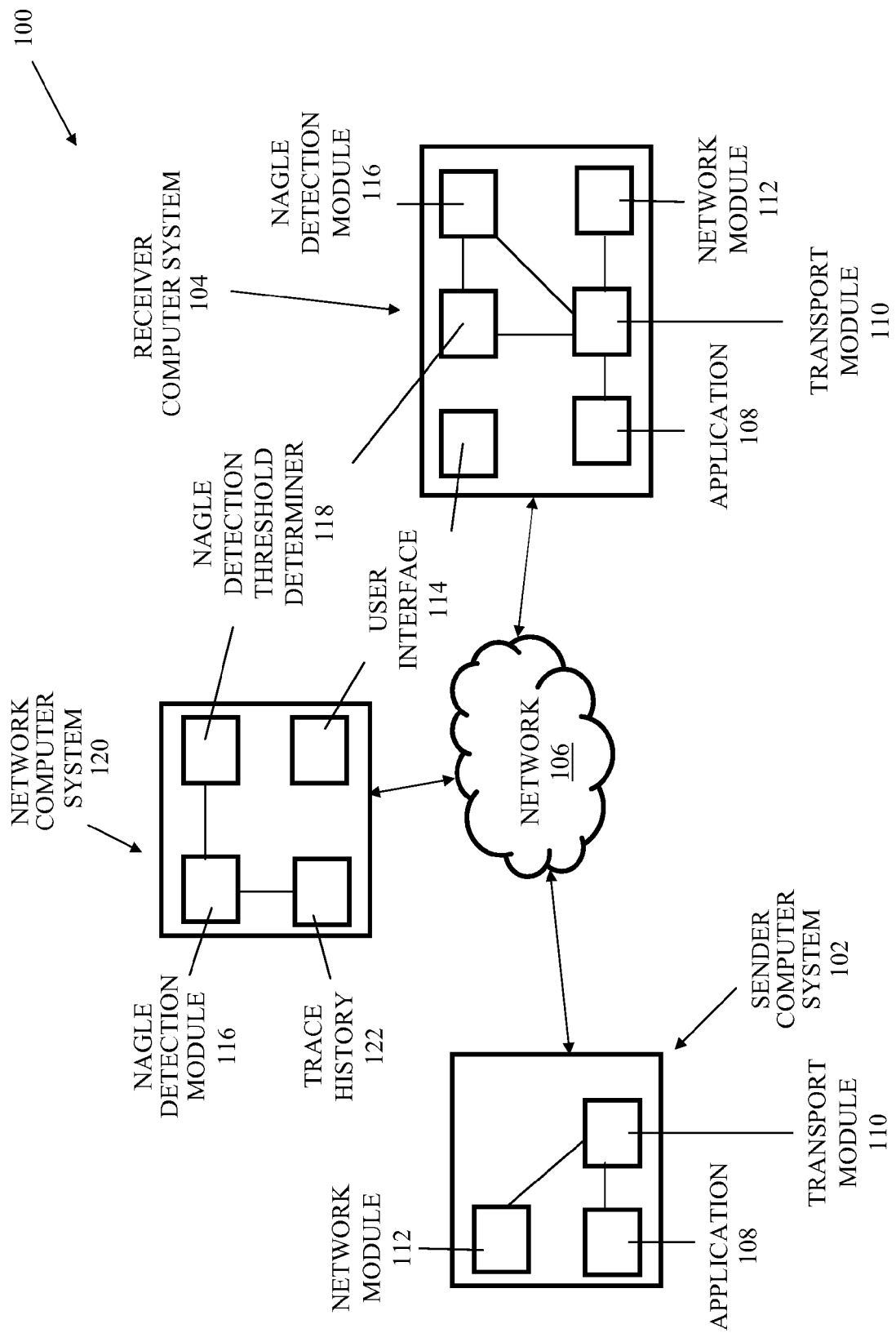
FIG. 1 depicts an environment for a Nagle detection system according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for detecting Nagling on a TCP network connection are disclosed. Embodiments may generally include a system with a Nagle detection threshold determiner for determining a Nagle detection threshold based on the network connection. The system may also generally include a Nagle detection module in communication with the Nagle detection threshold determiner for observing a small segment at a second time following an acknowledgement indicative of a Nagling condition at a first time, wherein the Nagle detection module also may detect a Nagling condition if the difference between the second time and the first time is less than or equal to the Nagle detection threshold. The system may be a receiver computer or a network computer. The system may also generate and transmit a notification of the Nagling condition, increment a Nagle monitor counter, or save an indication of the Nagling condition in a log.

The disclosed embodiments provide a methodology and system for detecting Nagling on a TCP network connection from either the perspective of a receiver computer or a network computer. By generating a warning when a Nagle condition exists, the Nagle detection system of the disclosed embodiments provides an effective mechanism for users or administrators to diagnose and possibly correct network problems. The Nagle detection system of the disclosed embodiments may provide a heuristic algorithm on the receiver side of the network connection for detecting delays caused by the Nagle algorithm. The Nagle detection system of the disclosed embodiments may also provide a heuristic algorithm used by a network computer (which is not an endpoint of the network connection) for detecting delays caused by the Nagle algorithm. In one example, if a network slowdown occurs, an administrator of a receiver computer may diagnose delays caused by the Nagle algorithm in real-time using the disclosed Nagle detection system for network connections associated with a plurality of sender computers, allowing for a quicker and more accurate diagnosis of the network condition (and which sender computer systems may have inefficient applications causing Nagling) than having an administrator analyze or sift through logs after the fact. In another example, a network provider may analyze the packet flow in a network to determine which network connections (and the associated sender computers and receiver computers) are having Nagling occurrences that may be causing slowdowns on the network.

While specific embodiments will be described below with reference to particular configurations of hardware and/or software, those of skill in the art will realize that embodiments of the present invention may advantageously be implemented with other substantially equivalent hardware and/or software systems.

Turning now to the drawings, FIG. 1 depicts an environment for a Nagle detection system according to one embodiment. In the depicted embodiment, Nagle detection system 100 includes a sender computer system 102 (sender computer) in communication with a receiver computer system 104 (receiver computer) via a network 106. The Nagle detection system 100 may also include a network computer system 120 (network computer). The sender computer system 102 may transmit data via a network connection on network 106 to the receiver computer system 104 utilizing a protocol such as TCP. Similarly, the receiver computer system 104 may transmit data, such as responses or acknowledgements, via the network connection on network 106 to the sender computer system 102. A network computer system 120 may also be in communication with network 106 or be part of network 106. In the Nagle detection system 100, the sender computer system 102 may communicate with the receiver computer system 104 via a TCP network connection established over network 106 by transmitting data packets and receiving responses or acknowledgements from the receiver computer system 104. Either the receiver computer system 104 or the network computer system 120, or both, may be able to detect the existence of Nagle-induced slowdowns and to generate a warning of the Nagling conditions. Both the sender computer system 102 and the receiver computer system 104 each may include an application 108, a transport module 110, and a network module 112. The transport module 110 and the network module 112 help applications 108 send and receive data over network 106.

The sender computer system 102, the receiver computer system 104, and the network computer system 120 may be one or more of any type of computer system, including servers, personal computers, workstations, mainframe computers, notebook or laptop computers, desktop computers, or the like, and each may be of different or similar type from the others. In one embodiment, the receiver computer system 104 is an IBM® eServer or similar server having one or more processors, or threads of processors, executing software and/or one or more state machines coupled with data storage devices such as random access memory (RAM), read only memory (ROM), flash memory, compact disk drives, hard drives, and the like. In this embodiment, the receiver computer system 104 may be in communication with (and have network connections with) a plurality of sender computer systems 102. For example, a service provider may use a receiver computer system 104 to interface with a large number of users using sender computer systems 102. In this embodiment, each sender computer system 102 may be, for example, an IBM® ThinkCentre™ or ThinkPad™ personal computer system having one or more processors, or threads of processors, executing software and/or one or more state machines coupled with data storage devices such as RAM, ROM, flash memory, compact disk drives, hard drives, and the like. The optional network computer system 120 may also be an IBM® eServer or similar server operated by a network provider. The sender computer system 102, the receiver computer system 104, and the network computer server 120 may be located at the same location, such as in the same building or computer lab, or could be remote. While the term "remote" is used with reference to the distance between the components of the Nagle detection system 100, the term is used in the sense of indicating separation of some sort, rather than in the sense of indicating a large physical distance between the systems.

Network 106 may be any type of data communications channel, such as the Internet, an intranet, a LAN, a WAN, an Ethernet network, or a wireless network. In one embodiment, network 106 utilizes the TCP/IP protocols. Those skilled in the art will recognize, however, that other types of data communication channels between the sender computer system 102, the receiver computer system 104, and/or the network computer system 120 may be used without departure from the scope and spirit of the invention. A computer network at its most basic level is a series of connections between computers which allow them to communicate. Protocols such as TCP and IP are pre-established mechanisms for communication over a network that help define the speed, content, and reliability of the network. A computer system using the TCP/IP protocol may use packets as a basic unit of transmission over network 106. A packet may typically include data and header information, such as checksums, protocol identifiers, destination and source addresses, and state information and may be broken up into multiple segments for transmission.

TCP/IP breaks up the full network protocol suite into a number of tasks (some of which are performed by a transport module 110 or network module 112) so that each application 108 need not have a full network protocol implementation and instead can rely on other 'layers' of the network protocol. TCP/IP generally includes a link layer, a network layer, a transport layer, and an application layer. Each layer may add its own header information to facilitate handling of data. An application 108 may be any software program that serves as the application layer. In one example, an application 108 may facilitate a user transmitting or receiving data via network 106 by sending and receiving data from the transport layer of the transport module 110. Applications 108 may include communications programs such as telnet, file transfer protocol (ftp), e-mail programs, Internet Relay Chat (IRC), and web browsers.

The transport layer, which may be implemented by a transport module 110, may provide data flows and guarantees of reliability for the application layer (which may be implemented by application 108). The transport module 110 may use the TCP protocol to help it ensure that packets are received in the order they are sent and that lost packets are retransmitted. An application 108 may use the transport module 110 to interact with the network module 112 and, thus, network 106.

The network layer may be implemented by a network module 112 and may determine how to get data to its intended destination. The network module 112 may use the IP protocol in one embodiment to send and receive packets of data. When data to be transmitted from a computer system is received from a transport module 110, the network module 112 may determine where to transmit a packet based on an IP address and how to route the packet in order to get it to its destination. When a network module 112 receives data from the link layer (which receives it from the network 106), it may hand the packet to the transport layer of the transport module 110 (discarding it in some situations if there is a problem with the packet). The link layer may be used for communicating with the actual network hardware, such as Ethernet or other network cards, and may include hardware device drivers. The link layer may receive data from the network 106, strip off any link layer header information and hand the data to the network layer of the network module 112. The link layer may also receive data from the network module 112, place a link layer header on the data, and put it on the network 106.

Using the transport module 110 and the network module 112, an application of the sender computer system 102 may transmit a data packet to an application 108 of the receiver computer system 104, which uses its own transport module 110 and network module 112 to receive the data packet and respond, if necessary. The receiver computer system 104 may also include a user interface 114, a Nagle detection module 116, and a Nagle detection threshold determiner 118. The user interface 114 may facilitate receipt of input from an administrator or other user as well as communication of information to the administrator or other user. The Nagle detection module 116 of the receiver computer system 104 may detect when the Nagle algorithm is being implemented (and potentially causing a slowdown in performance of the network connection) in addition to generating a warning of the Nagling condition. The Nagle detection module 116 may use the Nagle detection threshold calculated by the Nagle detection threshold determiner 118 in making its determination that a Nagle condition exists.

The user interface 114 of the receiver computer system 104 may receive input from an administrator or other user of the receiver computer system 104, such as requests to turn the Nagle detection module 116 on or off or requests to change settings of the Nagle detection module 116. The user interface 114 may include user input devices such as keyboards, mouse, voice-activated input, and the like to receive user input. The user interface 114 may also communicate information, such as Nagle algorithm-related statistics or current settings, to an administrator or other user of the receiver computer system 104 via any type of communication device, such as a display or speaker.

The Nagle detection module 116 may determine when the Nagle algorithm is being triggered (i.e., when a Nagling condition exists) and either generate a warning or take a different action in response. The Nagle detection module 116, when implemented in the receiver computer system 104, may interact with the transport module 110 as the Nagle algorithm is typically implemented in the transport layer. Alternatively, the transport module 110 may include the Nagle detection module 116. The Nagle detection module 116 may determine, based on the activity of the transport module 110, whether a delayed acknowledgement is transmitted to the sender computer system 102 for a small segment and whether that delayed acknowledgement is then followed by receipt (or observation) of another small segment from the sender computer system within the Nagle detection threshold determined by the Nagle detection threshold determiner 118. The difference between a second time when the small segment is received and a first time when the delayed acknowledgement is transmitted may be compared to the Nagle detection threshold, and if the difference is less than or equal to the Nagle detection threshold, a Nagling condition likely exists. Such an attempt provides a strong indication that the transmission of the second segment is being delayed at the sender computer system 102 by the Nagle algorithm being implemented in its transport module 110.

Once the Nagle detection module 116 of the receiver computer system 104 determines that when a Nagling condition exists, it may generate a warning or take other action in response. In one embodiment, the Nagle detection module 116 may generate and transmit a warning of the Nagling condition to a user, administrator, or performance monitoring and/or analysis software. In an alternative embodiment, the Nagle detection module 116 may record an indication of the Nagle condition, such as by recording in a log or incrementing a Nagle monitor counter. This allows an administrator or other user to quickly find a record of how often a Nagle conditions has occurred for a particular connection without having to intuit the information from a log or analyze logs or reports after the fact, allowing the user to diagnose network problems or identify sender computer systems 102 that have inefficient applications 108. This may be particularly useful when the receiver computer system 104 is in communication with a large number of sender computer systems 102 with unsophisticated users, as an operator of the receiver computer system 104 may be able to quickly diagnose Nagle-induced slowdowns caused by sender computer systems 102. For example, a service provider using a receiver computer system 104 that interfaces with a plurality of unsophisticated users with sender computer systems 102 may quickly determine which users are running inefficient applications 108 that cause Nagling-induced slowdowns.

The Nagle detection threshold determiner 118 of the receiver computer system 104 may determine or calculate the Nagle detection threshold, which is an estimate of the amount of time for the delayed acknowledgement to traverse network 106 to reach the sender computer system 102, the amount of time for processing by the sender computer system 102, and the amount of time for the small packet to traverse network 106 to the receiver computer system 104. The sum of these three estimates (hereinafter the network traversal time) may serve as the Nagle detection threshold, and if a receiver computer system 104 transmits a delayed acknowledgement of a small segment and then, within a timeframe equaling the Nagle detection threshold, receives a small segment, a Nagle-induced slowdown is likely occurring. Alternatively, the Nagle detection threshold may be based on the network traversal time, such as by setting the Nagle detection threshold at a value higher than the network traversal time by a fixed amount or a fixed percentage to account for variations in timeframes and to increase the chance of capturing all Nagling conditions (and at the risk of capturing additional spurious or false readings).

In one embodiment, the Nagle detection threshold determiner 118 of the receiver computer system 104 adaptively estimates the network traversal time by taking advantage of calculations already made by a transport module 110 as part of TCP. Well-known TCP implementations attempt to predict future round-trip times by sampling the behavior of packets sent over a connection and averaging those samples into a "smoothed" round-trip time estimate (SRTT). When a packet is sent over a TCP connection, the transport module 110 of the sender times how long it takes for it to be acknowledged, producing a sequence of round-trip samples which are then turned into an SRTT based on various calculations. The current SRTT estimate may serve as an estimate for the time for a small packet to traverse the network 106 in both directions. The Nagle detection threshold determiner 118 of the receiver computer system 104 may also estimate the processing time in the sender computer system 102 by creating a "smoothed" estimate of the difference between the measured RTT and the current SRTT estimate over time. This difference is currently calculated by TCP implementations but not typically saved.

The smoothed difference between the measured RTT and the current SRTT may serve as an estimate for the processing time in the sender computer system 102. In this embodiment, the network traversal time may thus be estimated by adding the current SRTT to the smoothed difference between the measured RTT and the current SRTT. Other methodologies for estimating the network traversal time are also possible.

Use of the Nagle algorithm may also be detected at a network computer system 120 instead of or in addition to at the receiver computer system 104. The network computer system 120 may include a user interface 114, a Nagle detection module 116, a Nagle detection threshold determiner 118, and a trace history 122. The user interface 114 is described in relation to the receiver computer system 104. The Nagle detection module 116 and the Nagle detection threshold determiner 118 of the network computer system 120 serve the same function as their equivalents in the receiver computer system 104 but may use a different function to accomplish their goals. As the network computer system 120 does not have the same state information maintained by the network connection endpoints such as the receiver computer system 104, it must use other methodologies for detecting use of the Nagle algorithm.

The Nagle detection module 116 of the network computer system 120 may determine that a Nagling condition exists by observing the packet flow between the sender computer system 102 and the receiver computer system 104 using standard packet capture methods. A history of the packet flow back to the initialization of a network connection may be stored in the trace history 122. A particular network connection may be identified by a source IP address, a destination IP address, a source port, and a destination port. The Nagle detection module may search the trace history 122 for an indication of a Nagling condition, such as a pure acknowledgement (with no data) that acknowledges less than twice the MSS of data followed by a small segment within the Nagle detection threshold determined by the Nagle detection threshold determiner 118 of the network computer system 120. A pure acknowledgement that acknowledges less than twice the MSS of data since the last acknowledgement on the particular network connection is likely a delayed acknowledgement. To determine if the delayed acknowledgment was caused by implementation of the Nagle algorithm, the Nagle detection module 116 determines if the delayed acknowledgement is followed by a small segment within the Nagle detection threshold (in other words, the difference between the times is less than the Nagle detection threshold), which would indicate that the small segment was held up by the Nagle algorithm.

The Nagle detection threshold determiner 118 may estimate the network traversal time by calculating the round-trip time of the three-way handshake network connection initiation sequence. The network connection initiation sequence, in one example, may include a synchronization message (SYN) from the sender computer system 102 to the receiver computer system 104 at a time T0, an acknowledgement (ACK) and synchronization message back to the sender computer system 102 at a time T1, and then an acknowledgement back to the receiver computer system 104 at a time T2. The Nagle detection threshold determiner 118 may then estimate the network traversal time for the network connection as T2 minus T0. As the SYN and ACK messages are very small, they provide a useful estimate for the network traversal time of small segments and delayed acknowledgements, which are also small packets. The Nagle detection threshold determiner 118 may find the record of the initialization of the network connection by review of the trace history 122. After estimating the network traversal time, the Nagle detection threshold determiner 118 may determine the Nagle detection threshold based on the network traversal time.

The disclosed embodiments of the Nagle detection system 100 provide an efficient and effective way of detecting a Nagle condition and managing the network connection at either the receiver computer system 104 or by an observing network computer system 120. The methodology of the disclosed embodiments provides a heuristic algorithm that may accurately estimate when the Nagle algorithm is causing delays in transmitting small segments. By detecting a Nagle condition and generating a warning, the Nagle detection system 100 provides an efficient receiver-side or network-based mechanism for analyzing network performance, diagnosing network slowdowns, and possibly improving network performance.

When the Nagle detection system 100 is used at a receiver computer system 104, an administrator or other user may quickly diagnose network slowdowns and identify applications 108 on sender computer systems 102 that are inefficiently transmitting data and triggering the Nagle algorithm without having to laboriously analyze network logs after the fact. A service provider operating a receiver computer system 104 may then quickly respond to user complaints of network slowdowns and possibly adapt the network connection configuration in response to the Nagling occurrences. A Nagle detection system 100 operating on a network computer system 100 allows a network provider to analyze the efficiency of network connections to identify sender computer systems 102 or receiver computer systems 104 that are inefficiently using network 106. When compared to existing systems, the Nagle detection system 100 of the disclosed embodiments provides administrators or other users a valuable insight into the operation of the Nagle algorithm on the network connection, facilitating diagnosis or correction of Nagle-induced slowdowns.

Figure 2:
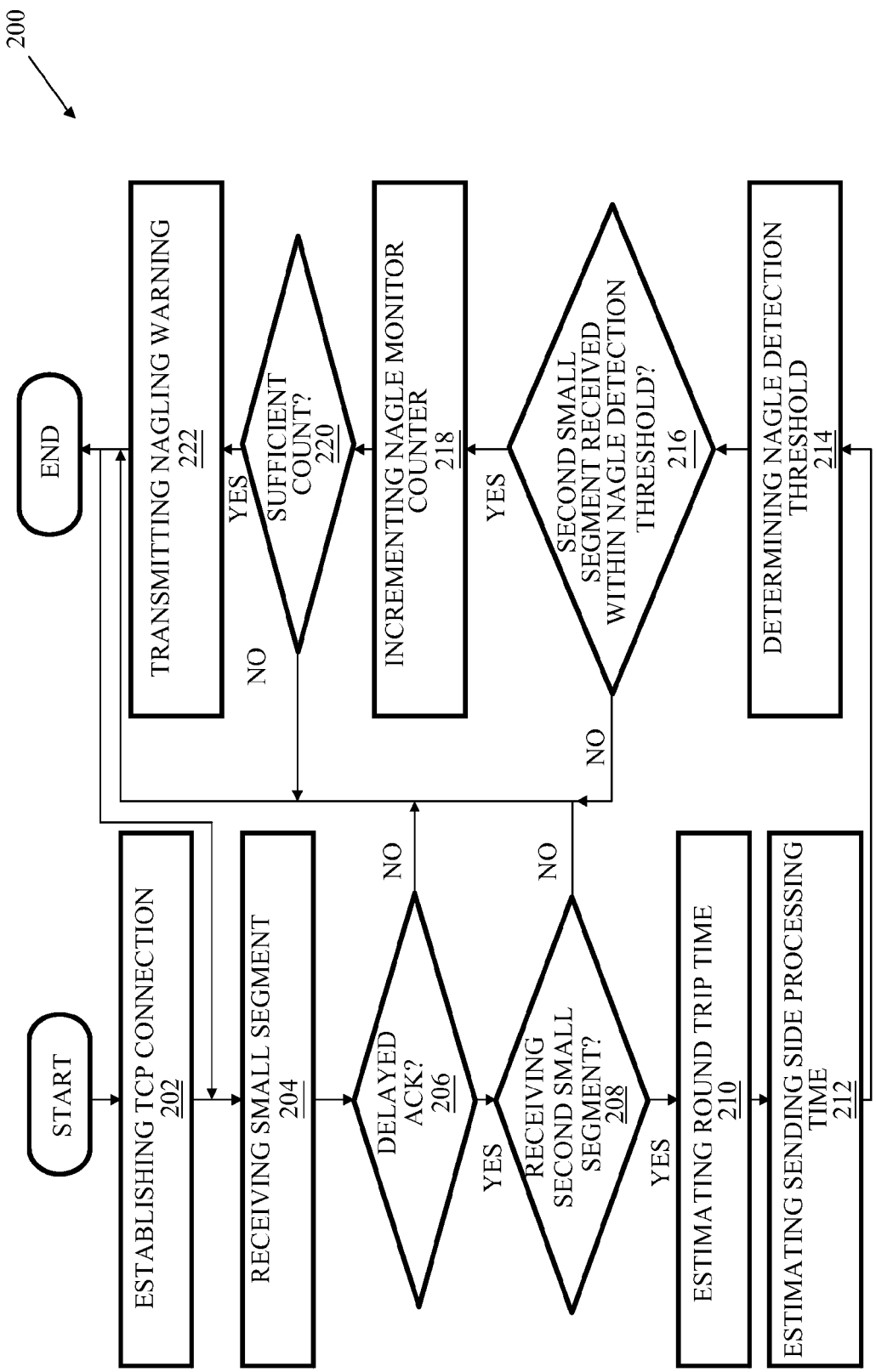
FIG. 2 depicts an example of a flow chart for detecting by a receiver computer system a Nagling condition and incrementing a Nagle monitor counter according to one embodiment.

FIG. 2 depicts an example of a flow chart for determining by a receiver computer system that a Nagling condition exists and incrementing a Nagle monitor counter according to one embodiment. The elements of the method of flow chart 200 may be performed by components of a receiver computer system 104 in one embodiment. At element 202, a component of the receiver computer system 104, such as the network module 112 or transport module 110, may establish a TCP connection with a sender computer system 102 via network 106. As part of establishing the TCP connection, the two computer systems may negotiate a MSS for the connection. While the network connection is active, the receiver computer system 104 may receive a small segment from a sender computer system 102 at element 204.

At decision block 206, the transport module 110 determines whether or not to transmit a delayed acknowledgement to the sender computer system 102 in response to the receiver small segment. In one embodiment, a receiver computer system 104 will not transmit an acknowledgement of a small segment until it may be piggybacked on another data packet, enough small segments are received so that their sum is greater than twice the MSS, or the delayed acknowledgement timer expires. If the delayed acknowledgement timer expires, flow chart 200 continues to decision block 208; otherwise, flow chart 200 returns to element 204 where it awaits new data or the flow chart terminates. The transport module 110 may create the delayed acknowledgement packet, which may include header information such as checksums, protocol identifiers, destination and source addresses, and state information into the packet.

The Nagle detection module 116 may determine if the receiver computer system 104 received a second small segment on the network connection after transmitting the delayed acknowledgement at decision block 208. If the receiver computer system 104 did not receive a second small segment, flow chart 200 either returns to element 204 where it awaits new data or the flow chart terminates. If the receiver computer system 104 did receive a second small segment, flow chart 200 continues to element 210 for beginning the calculation of the Nagle detection threshold. The receipt of a second small segment after transmitting a delayed acknowledgement may, if the second small segment is received soon enough, be an indication that the operation of the Nagle algorithm was delaying transmission of the second small segment at the sender computer system 102. Under a traditional Nagle algorithm, the existence of an unacknowledged small segment when a sender-side transport module 110 is attempting to transmit a second small segment will result in the delay of the transmission of the second segment until an acknowledgement of the first is received from the receiver computer system.

If a second small segment is received at decision block 208, the receiver computer system 104 will then begin determining the Nagle detection threshold to ascertain whether a Nagle-induced delay likely occurred. At element 210, the Nagle detection threshold determiner 118 may estimate the round-trip time for the delayed acknowledgement to travel to the sender computer system 102 and for the second small segment to travel to the receiver computer system 104. The Nagle detection threshold determiner 118 may adaptively estimate the round-trip time as the SRTT by taking advantage of calculations already made by a transport module 110 as part of TCP, as described in relation to FIG. 1. At element 212, the Nagle detection threshold determiner 118 may estimate the sending side processing time (the processing time in the sender computer system 102) by creating a "smoothed" estimate of the difference between the measured RTT and the current SRTT estimate over time, as described in relation to FIG. 1. The sum of the estimated round-trip time and the sending side processing time is the network traversal time. The Nagle detection threshold determiner 118 may then determine the Nagle detection threshold at element 214. The Nagle detection threshold may be based on the network traversal time, such as by using the network traversal time as the Nagle detection threshold or by modifying the network traversal time, as described in relation to FIG. 1.

After determining the Nagle detection threshold, the Nagle detection module 116 determines whether the second small segment was received within the Nagle detection threshold at decision block 216. The second small segment may be considered received within the Nagle detection threshold if the time between receipt of the second small segment and the delayed acknowledgement is less than or equal to the Nagle detection threshold. If the second small segment was received after the Nagle detection threshold, flow chart 200 either terminates or returns to element 204 for continued processing. If the second small segment was received within the Nagle detection threshold, a Nagle condition likely exists and the Nagle detection module 116 increments a Nagle monitor counter at element 218. The Nagle monitor counter may be part of the transport module 110, the Nagle detection module 116, or any other software located on the sender computer system 102. In one embodiment, the Nagle monitor counter may be implemented as an operating system (OS) counter that may be accessed by a utility. For example, the netstat command in the Linux and Unix operating systems may serve as a mechanism for maintaining a Nagle monitor counter. A utility of the receiver computer system 104 may access the Nagle monitor counter for communication to an administrator or other user. A Nagle monitor counter allows an administrator or other user to quickly determine how often the Nagle algorithm is delaying transmission of small segments so that the individual can diagnose network problems or improve the performance of the network connection.

After incrementing the Nagle monitor counter, the Nagle detection module 116 may determine in decision block 220 whether the Nagle monitor counter is sufficiently high to justify generating and/or transmitting a warning. The Nagle monitor counter is sufficiently high if the counter is higher than a defined Nagle monitor threshold. By providing a level (the Nagle monitor threshold) of the Nagle monitor counter at which events will take place, the risk of erroneous or spurious Nagle warnings is reduced as the warning will only occur if the level is passed. The number of Nagle warnings that result in the count being sufficiently high may be defined in any way, such as a user-defined amount, a default amount, based on network conditions, based on the preferences of the recipient of a warning, and the like. If the Nagle monitor counter is not sufficiently high, flow chart 200 either terminates or returns to element 204 for further processing. If the Nagle monitor is sufficiently high (higher than the Nagle monitor threshold), the Nagle detection module 116 may generate and/transmit a warning of the Nagling condition at element 222, after which the flow chart terminates. As described above, the Nagling warning may be transmitted to a user, administrator, an application 108, or performance monitoring and/or analysis software, any of which may be located at a receiver computer system 104 or other computer system. The Nagling warning may serve to assist administrators or other users in analyzing network performance and diagnosing slowdowns in network performance. In one embodiment, a user may use a real-time performance analysis tool that, upon receiving Nagling warnings, creates a real-time display showing the frequency of occurrence of the Nagling warnings or other performance information for one or more network connections. Using such software, a user or administrator could quickly diagnose whether a network slowdown was Nagle-induced. The Nagling warning may include any type of information, such as information relating to the network connection, the sender computer system 102 (such as IP address, port number, or other identifier), the identity of the application 108 sending or receiving the data, or a timestamp.

Figure 3:
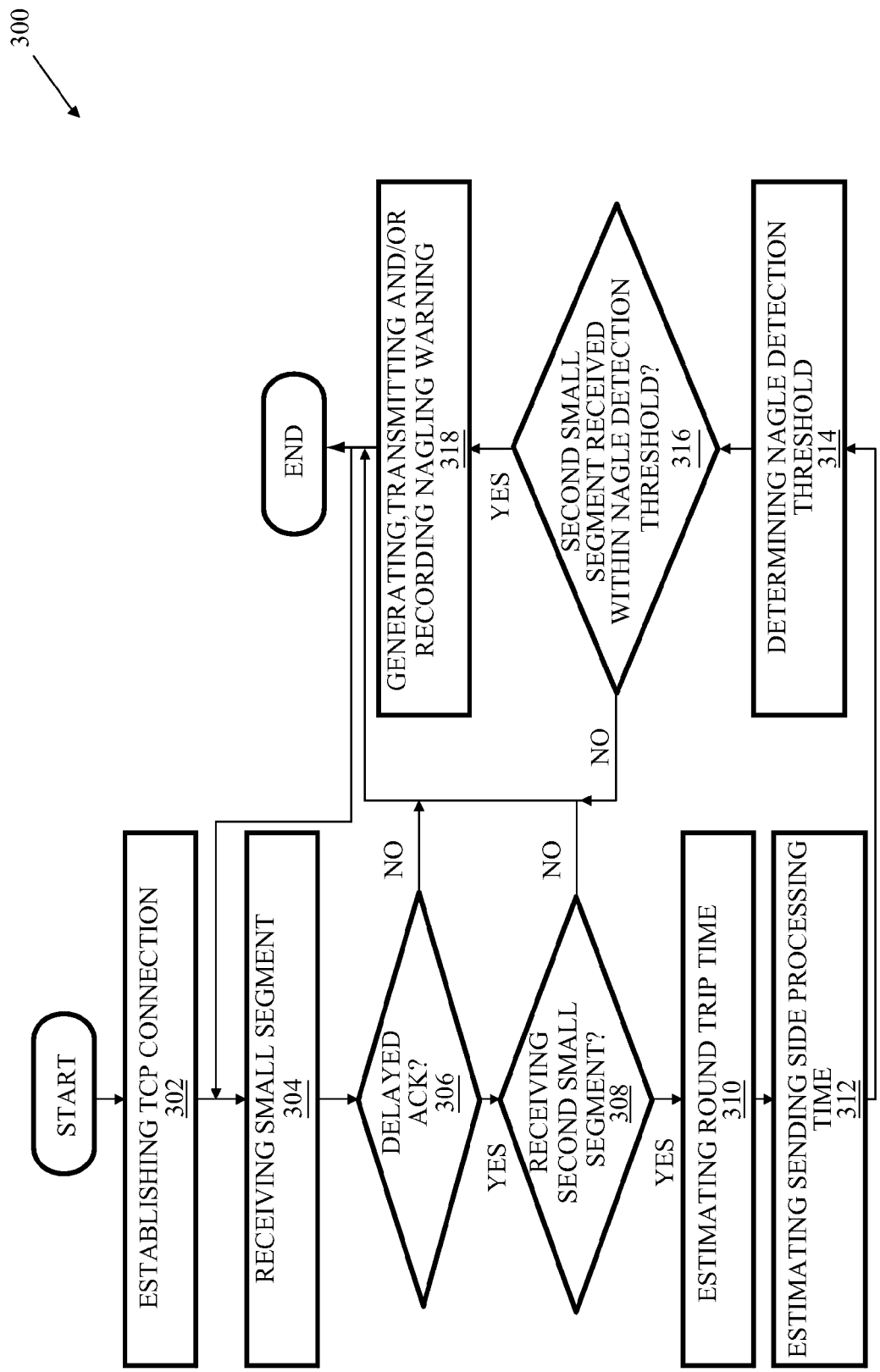
FIG. 3 depicts an example of a flow chart for detecting by a receiver computer system a Nagling condition and generating, transmitting, and/or recording a warning according to one embodiment.

FIG. 3 depicts an example of a flow chart for determining by a receiver computer system that a Nagling condition exists and generating, transmitting, or recording a warning according to one embodiment. The elements of the method of flow chart 300 may be performed by components of a receiver computer system 104 in one embodiment. Flow chart 300 begins with elements 302, 304, 306, 308, 310, 312, 314, and 316 which are substantially similar to the similarly numbered elements of the method of flow chart 200. An affirmative response at decision block 316 indicates that a Nagling condition likely exists, as the second small segment was received within the Nagle detection threshold.

At element 318, the Nagle detection module 116 may generate, transmit, and/or record a Nagling warning. In one example, the Nagling warning may be generated and transmitted to an administrator or other user of the receiver computer system 104, to a user of the sender computer system 102 at which the Nagling condition exists, to a network provider with a network computer system 120, or the like. In another example, the Nagle detection module 116 may record an indication of the Nagling condition in a log, such as a system event monitor or an event log. By recording a history of Nagle conditions for a network connection, administrators or other users may quickly determine how often the Nagle algorithm is delaying transmission of small segments so that an individual can diagnose network problems without having to sift through long event logs to try to analyze or intuit the cause of network slowdowns.

Figure 4:
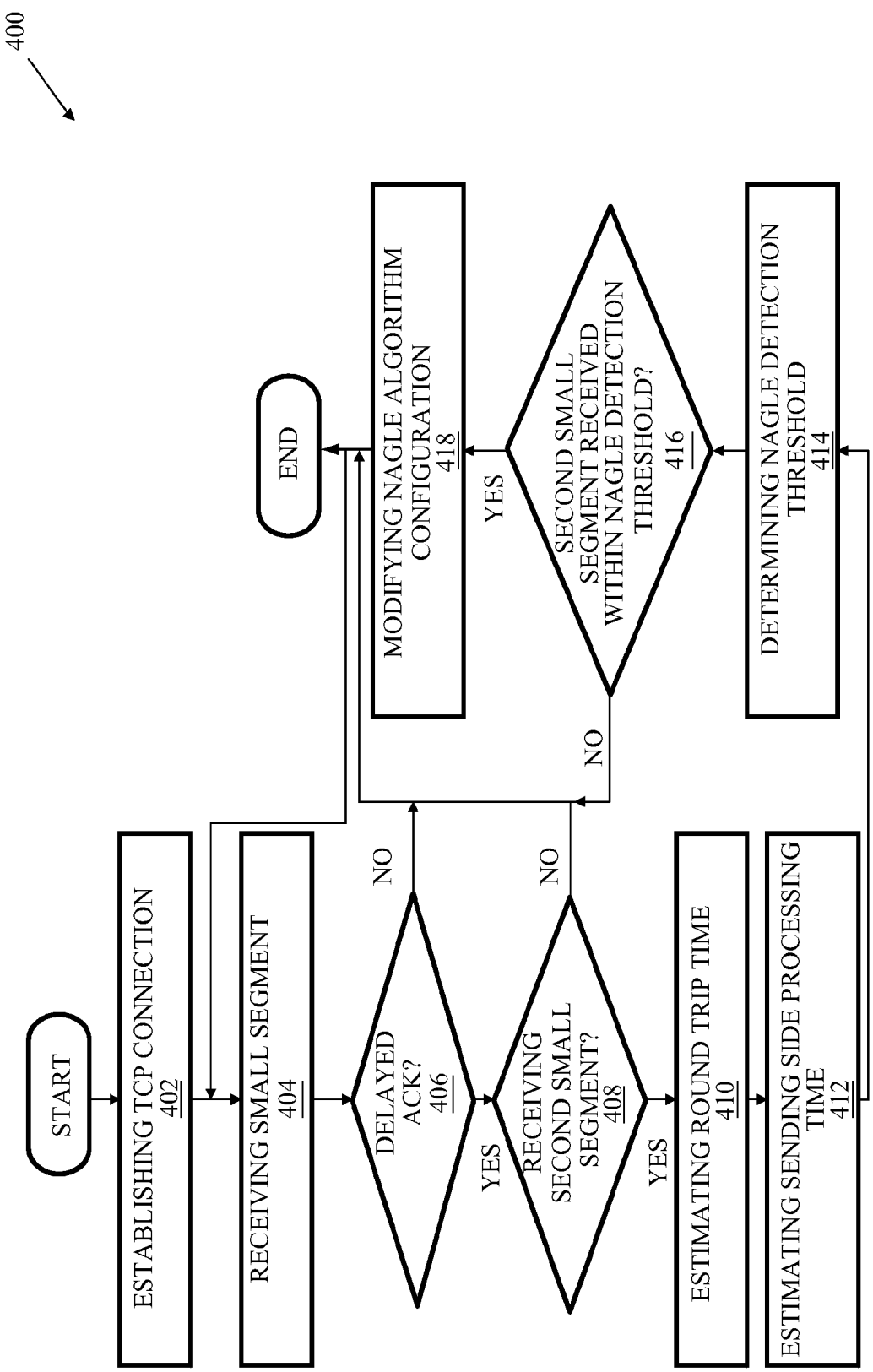
FIG. 4 depicts an example of a flow chart for detecting by a receiver computer system a Nagling condition and modifying the Nagle algorithm configuration according to one embodiment.

FIG. 4 depicts an example of a flow chart for determining by a receiver computer system that a Nagling condition exists and modifying the Nagle algorithm configuration according to one embodiment. The elements of the method of flow chart 400 may be performed by components of a receiver computer system 104 in one embodiment. Flow chart 400 begins with elements 402, 404, 406, 408, 410, 412, 414, and 416 which are substantially similar to the similarly numbered elements of the method of flow chart 200. An affirmative response at decision block 416 indicates that a Nagling condition likely exists, as the second small segment was received within the Nagle detection threshold.

At element 418, the transport module 110 of the receiver computer system 104 may modify the Nagle algorithm configuration in the event of an affirmative response in decision block 416 and a likely Nagle condition. The transport module 110 may modify the Nagle algorithm configuration in any appropriate fashion, such as by turning off the Nagle algorithm on a particular network connection or making it more difficult to trigger. For example, if a Nagling condition is being triggered too frequently on a particular network connection, the transport module 110 may turn off the Nagle algorithm for that network connection (such as via the TCP_NODELAY socket option) so that the excessive Nagling occurrences do not unduly slow the network. In another example, the transport module 110 may change the setting for the delayed acknowledgement to lower the timeframe for the delayed acknowledgement timer. In this example, the delayed acknowledgement timer may be lowered from its initial value, typically 200 milliseconds, to a lower value, which will reduce the effect of the Nagle algorithm. This allows an administrator more fine-tuned control than simply turning off the Nagle algorithm. Alternatively, the Nagle detection module 116 or application 108 of the receiver computer system 104 may modify the Nagle algorithm configuration in addition to or instead of the transport module 110.

The embodiments of FIGS. 2, 3 and 4 may be combined in any fashion. For example, the functions of FIGS. 2 and 4 may be combined by only modifying the Nagle algorithm configuration (element 418 of FIG. 4) after the Nagle monitor counter is incremented to a high enough level (elements 218 and 220 of FIG. 2). Other embodiments and combinations are possible.

Figure 5:
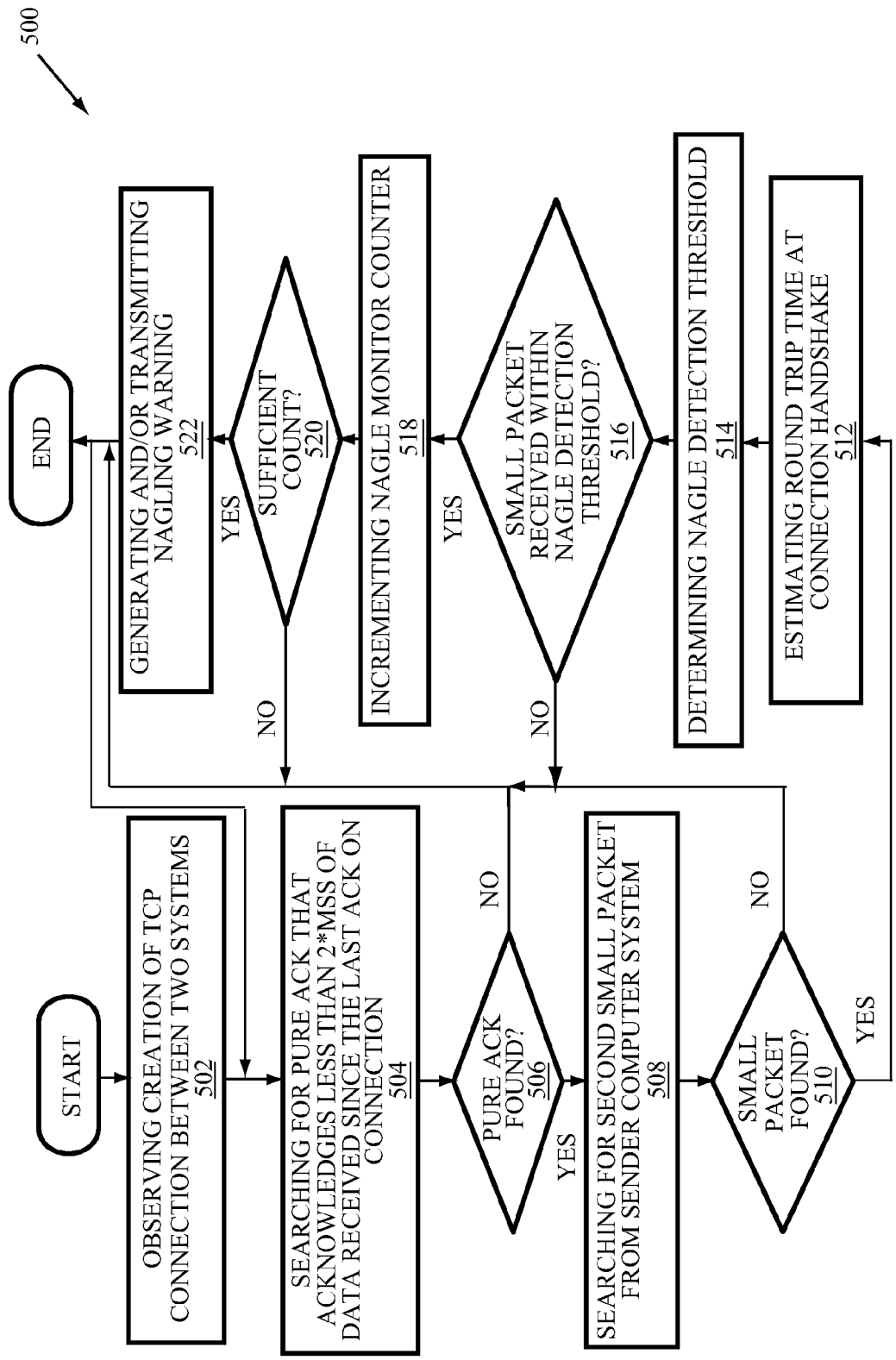
FIG. 5 depicts an example of a flow chart for detecting by a network computer system a Nagling condition according to one embodiment.

FIG. 5 depicts an example of a flow chart for determining by a network computer system that a Nagling condition exists according to one embodiment. The elements of the method of flow chart 500 may be performed by components of a network computer system 120 in one embodiment. Flow chart 500 may be performed in real-time by network computer system 120 or after a network connection is established as a diagnosis or analysis tool. At element 502, a component of the network computer system 120 such as the Nagle detection module 116 may observe the creation of a TCP connection between a sender computer system 102 and a receiver computer system 104 using standard packet capture methods. As part of element 502, the network computer system 120 may determine the negotiated MSS for the network connection and begin recording a history of the network connection in trace history 122.

At element 504, the Nagle detection module 116 of the network computer system 120 observe the packet flow between the sender computer system 102 and the receiver computer system 104 using standard packet capture methods to search for a pattern consistent with the Nagle algorithm. The Nagle detection module 116 first may search in element 504 for a pure acknowledgement (with no data) from one computer system that acknowledges less than twice the MSS of data since the last acknowledgement on the network connection. If such a pure acknowledgement is not found in decision block 506, flow chart 500 returns to element 504 for continued searching or terminates. If such a pure acknowledgement is found, it may indicate a delayed acknowledgement and flow chart 500 continues to element 508, where the Nagle detection module 116 may search for a small packet from the other computer system following the pure acknowledgement that is within the Nagle detection threshold. The small packet may be considered received within the Nagle detection threshold if the time between receipt of the small packet and the pure acknowledgement is less than or equal to the Nagle detection threshold. If the small packet is found following the pure acknowledgement, flow chart 500 continues to element 512 for calculation of the Nagle detection threshold. If the small packet is not found in decision block 510, flow chart 500 returns to element 504 for continued operation or terminates.

The Nagle detection threshold determiner 118 of the network computer system 120 may determine the round-trip time at the connection handshake in element 512. As described in relation to FIG. 1, the Nagle detection threshold determiner 118 may review the trace history to ascertain how long the network connection initiation took and may use this time as the network traversal time. After estimating the network traversal time, the Nagle detection threshold determiner 118 may determine the Nagle detection threshold based on the network traversal time in element 514.

At decision block 516, the Nagle detection module 116 of the network computer system 120 determines whether the small packet from the second system was detected within the Nagle detection threshold. If the Nagle detection module 116 does not detect a small packet within the Nagle detection threshold, flow chart 500 either returns to element 504 where it continues to search or the flow chart terminates. If the second packet was detected within the Nagle detection threshold, a Nagle condition likely exists and the Nagle detection module 116 increments a Nagle monitor counter at element 518. After incrementing the Nagle monitor counter, the Nagle detection module 116 may determine in decision block 520 whether the Nagle monitor counter is high enough to justify acting upon, such as if the Nagle monitor counter is greater than a Nagle monitor threshold. If the Nagle monitor counter is not high enough, flow chart 500 either terminates or returns to element 504 for further processing. If the Nagle monitor is high enough, flow chart 500 continues to element 522, generating or transmitting a Nagling warning, after which the flow chart terminates. As described above, the Nagling warning may be transmitted to a user, administrator, or performance monitoring and/or analysis software, any of which may be located at the network computer system 120 or other computer system. In one embodiment, the network computer system 120 may transmit a Nagling warning to a receiver computer system 104 for informational purposes or so that corrective action may be performed. Alternatively, the network computer system 120 may record an indication of the Nagling condition in a log. Other responses to detecting a potential Nagling condition are possible.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for detecting Nagling on a TCP network connection. It is understood that the form of the invention shown and described in the detailed description and the drawings are to be taken merely as examples. It is intended that the following claims be interpreted broadly to embrace all the variations of the example embodiments disclosed.

What is claimed is:

1. A data processing system for detecting Nagling on a Transmission Control Protocol (TCP) network connection, the data processing system comprising:
    one or more processors, one or more computer-readable memories and one or more computer-readable, tangible storage devices;
    program instructions, stored on at least one of the one or more storage devices for execution by at least one of the one or more processors via at least one of the one or more memories, to receive, by a receiver computer, a small segment from a sender computer;
    program instructions, stored on at least one of the one or more storage devices for execution by at least one of the one or more processors via at least one of the one or more memories, to transmit, by the receiver computer, a delayed acknowledgement of the small segment to the sender computer at a first time;
    after performing the program instructions to transmit the delayed acknowledgement, program instructions, stored on at least one of the one or more storage devices for execution by at least one of the one or more processors via at least one of the one or more memories, to receive, by the receiver computer, a second small segment from the sender computer at a second time;
    program instructions, stored on at least one of the one or more storage devices for execution by at least one of the one or more processors via at least one of the one or more memories, to determine, by the receiver computer, a Nagle detection threshold for the network connection and a difference between the second time and the first time; and
    if the difference between the second time and the first time is less than or equal to the Nagle detection threshold, program instructions, stored on at least one of the one or more storage devices for execution by at least one of the one or more processors via at least one of the one or more memories, to detect, by the receiver computer, a Nagling condition.

2. The data processing system of claim 1, further comprising:
    wherein the program instructions to detect comprises program instructions, stored on at least one of the one or more storage devices for execution by at least one of the one or more processors via at least one of the one or more memories, to increment, by the receiver computer, a Nagle monitor counter of the receiver computer in response to the detected Nagling condition; and
    if the Nagle monitor counter is above a Nagle monitor threshold, program instructions, stored on at least one of the one or more storage devices for execution by at least one of the one or more processors via at least one of the one or more memories, to transmit, by the receiver computer, a Nagling warning.

3. The data processing system of claim 2, wherein the Nagling warning comprises at least one of an IP address, a port number, or a timestamp.

4. The data processing system of claim 2, wherein detecting the Nagling condition is performed in real time as data is being transmitted between the sender computer and the receiver computer.

5. The data processing system of claim 2, wherein the Nagle detection threshold is set based on a network traversal time by setting the Nagle detection threshold to a value higher than the network traversal time by a fixed amount or a fixed percentage.

6. The data processing system of claim 2, wherein the Nagle detection threshold is calculated adaptively based on a smoothed round-trip time estimate performed by a transport module of the receiver computer and further based on an estimate of a processing time in the sender computer system based on a difference between a measured round-trip time of the network connection and a current smoothed round-trip time estimate of the network connection.

7. The data processing system of claim 1, further comprising:
    wherein the network connection has a Nagle algorithm configuration; and
    program instructions, stored on at least one of the one or more storage devices for execution by at least one of the one or more processors via at least one of the one or more memories, to modify, by the receiver computer, the Nagle algorithm in response to the detected Nagling condition by turning off the Nagle algorithm for the network condition or by reducing the delayed acknowledgement timer for the network connection.

8. The data processing system of claim 1, wherein the program instructions to determine, by the receiver computer, the Nagle detection threshold comprises:
    program instructions, stored on at least one of the one or more storage devices for execution by at least one of the one or more processors via at least one of the one or more memories, to estimate, by the receiver computer, a round-trip time of the network connection;
    program instructions, stored on at least one of the one or more storage devices for execution by at least one of the one or more processors via at least one of the one or more memories, to estimate, by the receiver computer, a sending side processing time; and
    wherein the Nagle detection threshold is determined based on an estimated network traversal time, the estimated network traversal time comprising a sum of the estimated round-trip time and the estimated sending side processing time.

9. The data processing system of claim 1, wherein the program instructions to determine comprises one or more of:
    program instructions, stored on at least one of the one or more storage devices for execution by at least one of the one or more processors via at least one of the one or more memories, to generate and transmit, by the receiver computer, a notification of the Nagling condition, program instructions, stored on at least one of the one or more storage devices for execution by at least one of the one or more processors via at least one of the one or more memories, to display, by the receiver computer, an indication of the Nagling condition, program instructions, stored on at least one of the one or more storage devices for execution by at least one of the one or more processors via at least one of the one or more memories, to increment, by the receiver computer, a Nagle monitor counter of the receiver computer, or program instructions, stored on at least one of the one or more storage devices for execution by at least one of the one or more processors via at least one of the one or more memories, to record, by the receiver computer, an indication of the Nagling condition in a log.

10. The data processing system of claim 1, further comprising a trace history, the trace history being adapted to store a history of transmissions on the network connection.

11. The data processing system of claim 1, further comprising a user interface, the user interface being adapted to display an indication that the Nagling condition exists.

12. A data processing system for detecting Nagling on a Transmission Control Protocol (TCP) network connection having a maximum segment size (MSS), the data processing system comprising:
one or more processors, one or more computer-readable memories and one or more computer-readable, tangible storage devices;
program instructions, stored on at least one of the one or more storage devices for execution by at least one of the one or more processors via at least one of the one or more memories, to search, by a network computer, for a pure acknowledgement from a receiver computer to a sender computer over the network connection that acknowledges less than twice the MSS of data received since a last acknowledgement on the network connection;
if the pure acknowledgement is found, program instructions, stored on at least one of the one or more storage devices for execution by at least one of the one or more processors via at least one of the one or more memories, to search, by the network computer, for a small packet transmitted from the sender computer to the receiver computer after the pure acknowledgement;
program instructions, stored on at least one of the one or more storage devices for execution by at least one of the one or more processors via at least one of the one or more memories, to determine, by the network computer, a Nagle detection threshold and a difference in time between detection of the pure acknowledgement and the small packet; and
if the difference in time is less than or equal to the Nagle detection threshold, program instructions, stored on at least one of the one or more storage devices for execution by at least one of the one or more processors via at least one of the one or more memories, to detect, by the network computer, a Nagling condition.

13. The data processing system of claim 12, further comprising program instructions, stored on at least one of the one or more storage devices for execution by at least one of the one or more processors via at least one of the one or more memories, to observe, by the network computer, a creation of the network connection between the receiver computer and the sender computer.

14. The data processing system of claim 12, further comprising:
wherein the program instructions to detect comprises program instructions, stored on at least one of the one or more storage devices for execution by at least one of the one or more processors via at least one of the one or more memories, to incrementing, by the network computer, a Nagle monitor counter of the network computer in response to the detected Nagling condition; and
if the Nagle monitor counter is above a Nagle monitor threshold, program instructions, stored on at least one of the one or more storage devices for execution by at least one of the one or more processors via at least one of the one or more memories, to transmit, by the network computer, a Nagling warning to one or more of a user, an administrator, the receiver computer, and the sender computer.

15. The data processing system of claim 14, wherein the Nagling warning comprises at least one of an IP address, a port number, or a timestamp.

16. The data processing system of claim 12, wherein the program instructions to search comprise to search one or more of the network in real-time or a trace history associated with the network connection.

17. The data processing system of claim 12, wherein the program instructions to determine, by the network computer, a Nagle detection threshold comprises:
program instructions, stored on at least one of the one or more storage devices for execution by at least one of the one or more processors via at least one of the one or more memories, to estimate the round-trip time of a connection handshake from creation of the network connection; and
wherein the Nagle detection threshold is determined based on an estimated roundtrip time at the connection handshake.

18. The data processing system of claim 12, wherein the program instructions to detect comprises one or more of:
program instructions, stored on at least one of the one or more storage devices for execution by at least one of the one or more processors via at least one of the one or more memories, to generate and transmit, by the network computer, a notification of the Nagling condition,
program instructions, stored on at least one of the one or more storage devices for execution by at least one of the one or more processors via at least one of the one or more memories, to display, by the network computer, an indication of the Nagling condition,
program instructions, stored on at least one of the one or more storage devices for execution by at least one of the one or more processors via at least one of the one or more memories, to increment, by the network computer, a Nagle monitor counter of the receiver computer, or
program instructions, stored on at least one of the one or more storage devices for execution by at least one of the one or more processors via at least one of the one or more memories, to record, by the network computer, an indication of the Nagling condition in a log.

19. The data processing system of claim 12, further comprising a trace history, the trace history being adapted to store a history of transmissions on the network connection.

20. The data processing system of claim 12, further comprising a user interface, the user interface being adapted to display an indication that the Nagling condition exists.

* * * * *